Figure 1:
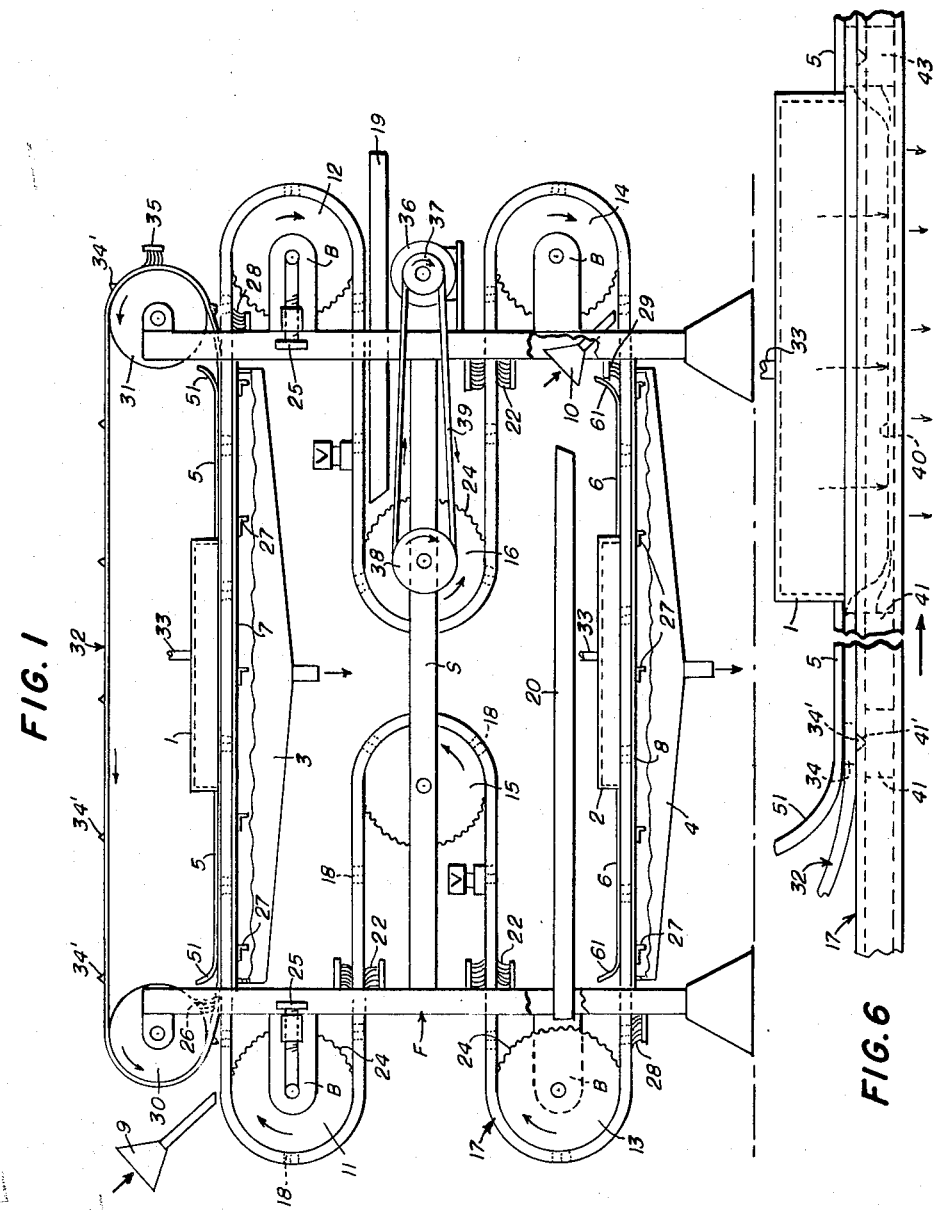

April 9, 1963 C. BOUNIN 3,084,987
METHOD AND APPARATUS FOR THE PRESSURE FILTRATION
OF SUSPENSIONS OF SOLIDS IN LIQUIDS
Filed March 29, 1960 4 Sheets-Sheet 2

INVENTOR
CLAUDE BOUNIN

ATTORNEYS

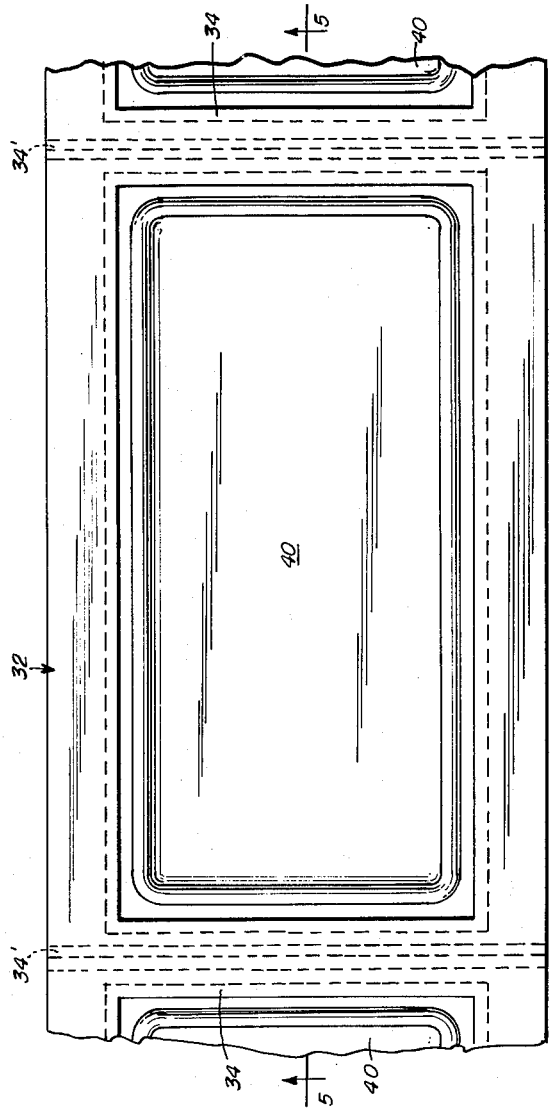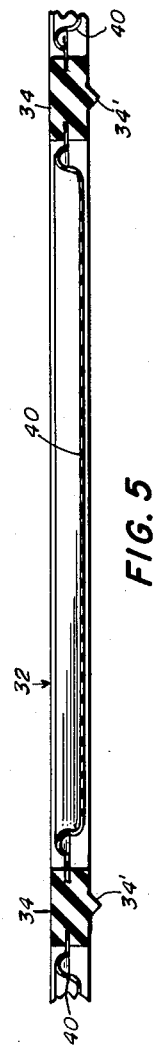

April 9, 1963 C. BOUNIN 3,084,987
METHOD AND APPARATUS FOR THE PRESSURE FILTRATION
OF SUSPENSIONS OF SOLIDS IN LIQUIDS
Filed March 29, 1960 4 Sheets-Sheet 4

INVENTOR
CLAUDE BOUNIN

BY
ATTORNEYS

United States Patent Office 3,084,987
Patented Apr. 9, 1963

3,084,987
METHOD AND APPARATUS FOR THE PRESSURE FILTRATION OF SUSPENSIONS OF SOLIDS IN LIQUIDS
Claude Bounin, Paris, France, assignor to Deka S.A., Geneva, Switzerland
Filed Mar. 29, 1960, Ser. No. 18,321
6 Claims. (Cl. 210—73)

The present invention relates broadly to the art of filtration.

More particularly, the invention relates to a method and apparatus for the pressure filtration of suspensions of solids in liquids.

It has been proposed that filtering of a suspension of solids in liquid under pressure is more economical than carrying out a filtration process which utilizes vacuum.

This invention, therefore, is directed to the utilization of pressure to effect filtration of a suspension of solids in liquids through a filter medium, either by utilizing a fluid under pressure or by compressing the suspension.

It is a further feature of the invention to provide a process of imparting to the filter medium a continuous or an intermittent motion.

The invention has for an object to provide a method and apparatus of effecting filtration under pressure which utilizes a filter medium divided into successive compartments by means of lateral and transverse compartment edge-defining means having upper and lower edges arranged to provide tightness and in which during filtration, the edge-defining means are engaged between two parallel plates arranged to compress them so as to isolate each compartment and render the same liquid tight.

It is a further object of the invention to effect the application of pressure on the suspension contained in each compartment by means of compressed air or by utilization of suspension under pressure, one of the plates mentioned above being perforated so as to permit the filtrate to pass therethrough.

It is a specific object to provide an arrangement in which a filter medium is provided in the form of an endless band, divided into compartments by suitable edge-defining means and moved through a pressure applying zone after having received a supply of suspension so that in such zone the pressure effect existing therein forces the liquid of the suspension through the filter medium and exteriorly of the band, the cake being retained and thereafter discharged.

The invention specifically provides an apparatus in which an endless band structure including a filter medium is trained over a plurality of rolls, one or more of which is driven and in which at two spaced portions along the length of the band means it passes between plates, one of which is perforated and during passage between the plates the successive compartments in the band means are subjected to a pressure effect, so as to expel liquid from the band means. The invention includes an arrangement where the band means is trained over superposed pairs of parallel rolls including upper and lower pairs of rolls that are vertically aligned and an intermediate pair of rolls transversely spaced apart a distance such as to be disposed intermediate the axes of the upper and lower rolls whereby the surface of the endless band means that is the upper surface when travelling between the rolls of the upper pair constitutes the lower surface when travelling between the rolls of the lower pair so as to permit feeding of suspension in a direction to effect filtration through the band means in opposite directions, whereby two successive pressure filtrations will insure cleaning of the filter medium.

The invention further provides an arrangement in which pressure filtration of a solids-liquid suspension can be effected in a first pressure stage of applying pressure in a given direction transverse to the direction of movement of the endless band means and in which soluble particles contained in the cake following the first filtration can be eliminated by the use of a suitable liquid under pressure forced through the band means in the same direction as the pressure applied during the first filtration, and which liquid is capable of eliminating the soluble particles from the cake.

Figure 2:
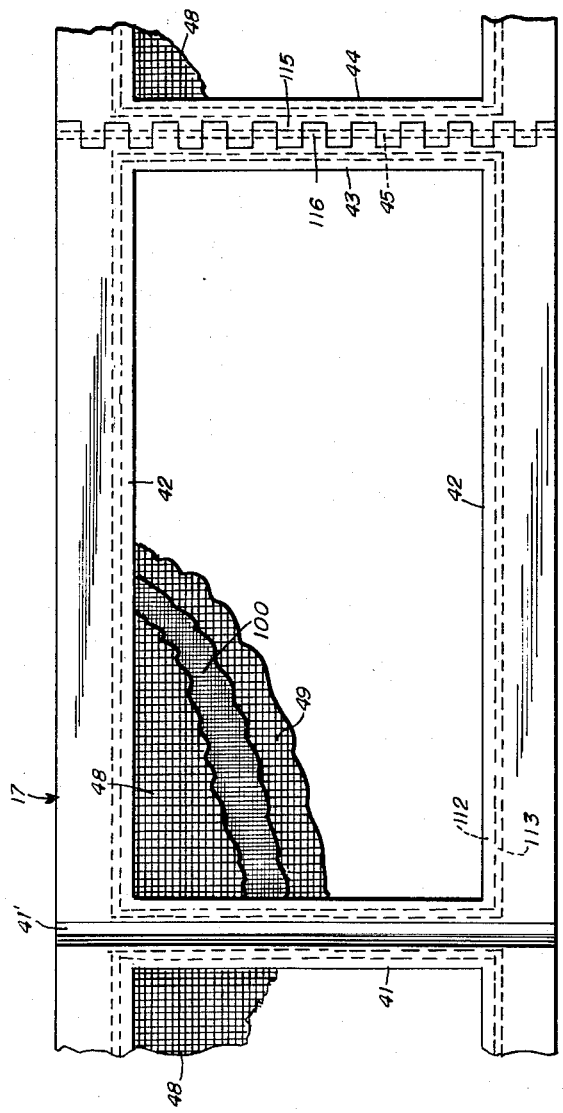
Figure 3:
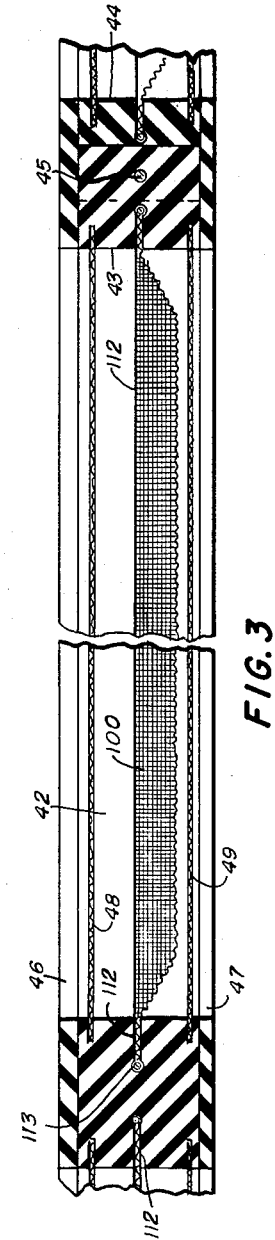
Figure 7:
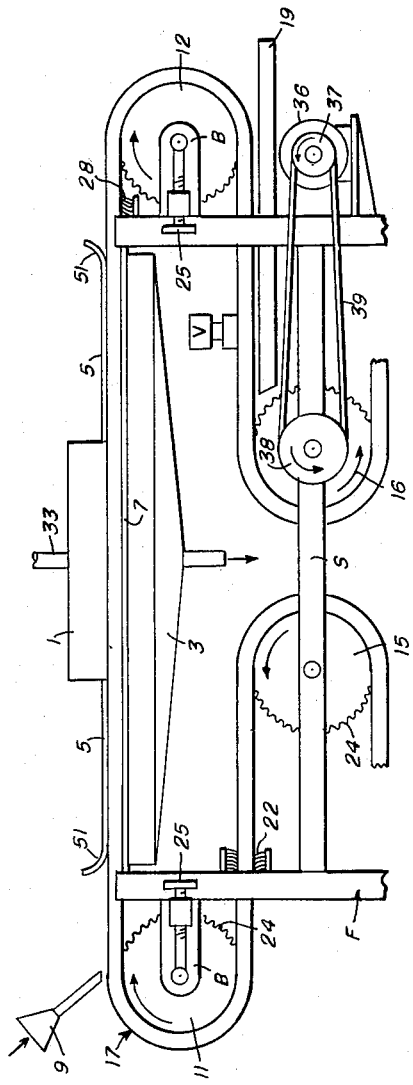

Further and more specific objects of the invention will be apparent from the following description taken in connection with the accompanying drawing in which:

FIGURE 1 is a diagrammatic end elevational view of one form of apparatus for effecting pressure filtration in accordance with this invention, FIGURE 2 is a fragmentary top plan view of one form of endless filtering band means, FIGURE 3 is a sectional view of a modified form of endless filtering band means, FIGURE 4 is a top plan view on an enlarged scale of a component of the apparatus shown in FIGURE 1, FIGURE 5 is a cross-sectional view taken on line 5—5 of FIGURE 4, FIGURE 6 is a fragmentary view illustrating a portion of the apparatus shown in FIGURE 1 on an enlarged scale, and FIGURE 7 is a fragmentary view diagrammatically illustrating a modified form of apparatus.

In FIGURE 1, apparatus is disclosed which includes a frame means denoted diagrammatically at F having opposite ends provided with brackets B arranged in superposed pairs and which support pairs of rollers 11, 12 and 13, 14. Intermediate rollers 15, 16 have their shafts supported by suitable supporting components of the frame shown diagrammatically at S. As indicated, the rollers are arranged in parallelism with the spacing between the rollers of the upper pair being the same as between the rollers of the lower pair while the intermediate rollers 15, 16 are arranged closer together so that both of these rollers are intermediate the respective rollers of the other pairs.

An endless band means 17 incorporating the filter medium is trained over the rollers as shown so that during the intermittent or continuous travel of such band means the surface thereof, that is, the upper surface when passing between rollers 11 and 12 constitutes the lower surface when passing between the rollers 14 and 13, assuming the band moves in the direction of the arrow. Superposed pairs of spaced plate means, 5 and 7 and 6 and 8 are arranged on opposite sides of the path of travel of the band means between the upper and lower pairs of rolls.

Plates 7 and 8 are flat and are supported by transverse bars 27, whereas the leading and trailing edges of plates 5 and 6, as regards the direction of movement of the band means are curved away from the band means as at 51 and 61 respectively. Beneath the plates 7 and 8 are disposed filtrate collecting compartments 3 and 4, plates 7 and 8 being suitably perforated. Intermediate the rolls 11 and 12 and on the upper surface of the band means is mounted a compartment 1 that constitutes a pressure-applying compartment. A similar compartment 2 is disposed in juxtaposition to plate 6. Plates 5 and 6 are either cut out to accommodate the lower edges of the compartments 1 and 2 or else perforated so that compressed air or suspension under pressure that is introduced into the compartments 1 and 2 via inlets 33 can act on the endless band filtering means.

Above roller 11 is a feed spout 9 through which solids-liquid suspension is fed to the endless band filtering means. Another feed spout 10 is arranged behind roller 14, as regards its direction of rotation so that additional suspension can be fed on to the endless band means. In this connection, it is noted that the surface of the endless band means that is the upper surface, when passing under feed spout 9 is the opposite or lower surface of the band means when passing under feed spout 10.

The endless band means includes lateral and transversely extending compartment edge-defining means which divide the endless band means into a plurality of successive filtering compartments. Each compartment includes a filter medium and the edge-defining means of the filled compartments after passing beneath spouts 9 and 10 are compressed by plates 5 and 7 and 6 and 8 when moving between these plates. The arcuate ends of plates 5 and 6 function for the purpose of applying progressive compression to the edge-defining means. It is also possible to provide lateral or side guide means to apply compression laterally of the endless band means 17 to insure tightness.

It is to be pointed out, with regard to FIGURE 1 that the relative dimensions as regards to direction of motion of the endless band means 17 between successive transverse compartment edge-defining means such as 18, the length of compartment 1 in the direction of motion of band means 17, the distance between the point on plate 5 where a filtering compartment is tight and the lefthand end of compartment 1 and the distance between the other end of compartment 1 and the exit end of plate 5 is such that when pressure is applied to a filter compartment formed between two successive transverse edge-defining means 18, the trailing one with respect to the direction of motion is already compressed between plates 5, 7 or 6, 8 so that at the exit end between the plates the leading edge of a compartment remains engaged between the plates as long as pressure is applied to that compartment. The dimension of the pressurizing compartments 1 and 2 in the direction of motion is in excess of the extent in the same direction of two filtering compartments, whereas the extent of plates 5 and 6 beyond the opposite ends of the pressurizing compartments 1, 2 is greater than the extent in the direction of motion of a single filtering compartment, all filtering compartments being of equal dimensions.

To effect driving of the endless band means 17, at least one of the rollers is a driving roller. Suitable band tighteners such as 25 are mounted between the frame F and the spindles of, for example, rollers 11 and 12 which are mounted in slots in the upper brackets B. These tighteners maintain the band means 17 under a suitable tension. Teeth or sprockets 24 are arranged on the ends of the rollers for cooperation with chains, not shown, that can be carried by the lateral or side edge-defining means of the compartments. If desired, the band can be driven by friction effect without the use of chains assuming one or more of the rolls is driven. The drawing illustrates a bracket supporting a motor 36 driving pulley 37 and a belt 39 trained over a pulley 38 carried by the shaft of roller 16. Obviously, motor 36 can be operated either continuously or intermittently to effect continuous or intermittent movement of band means 17 as desired.

Tanks 19 and 20 are provided to collect filter cake which falls apart after filtration due to localized vibration or shocks on rollers 12 and 13 or on the portions of the endless band passing between rollers 12 and 16 or rollers 13 and 15 by use of conventional vibrators such as at V. The collected filter cake can be removed by any conventional means, such as a rake means, not shown.

Brushes 26 and 29 insure cleaning of the edge-defining means of the band during rotation after introduction of suspension and before engagement of the compartment edge-defining means between the plates. Brushes 22 insure cleaning of the compartment edge-defining means during travel of the band, brushes 21 and 23 clean the periphery of rollers 12 and 13, respectively, and brushes 28 are provided at the discharge ends of plates 7 and 8 to clean the undersurface of the compartment edge-defining means.

FIGURES 2 and 3 illustrate two forms of the endless band means 17. In both of these figures, the compartment edge-defining means include compartment side components 42 and transverse components 41, 43 and 44. These components are of flexible material such as rubber so that when passing between the plates 5 and 7 they can be compressed to ensure tightness as regards the successive compartments. If desired, these components can receive a layer of more flexible rubber or rubberized material on the top and bottom thereof as shown at 46 and 47 in FIGURE 3. Thus, in both arrangements the upper and lower surfaces of the endless band means 17 are subjected to compression by the plates 5, 7 and 6, 8 so that the open space between components 41, 42 and 43, for example, when filled with solids-liquid suspension can be subjected to pressure when passing through pressurizing compartments 1 or 2.

Extending across the open space of each compartment are upper and lower supports such as shown at 48 and 49. These supports can be made of threads, cords or ropes, stretched in both directions as shown in FIG. 2 between the compartment edge-defining components 41, 42, 43 as shown. These supports can likewise be constructed of grating or of perforated plates of flexible material. The filter medium or cloth is shown at 100, and is engaged in a continuous groove 112 formed in transverse compartment defining components 41 and 43 and in the compartment edge-defining components 42. This filter medium can be surrounded by a frame, not shown, which can be engaged in an enlarged base 113 of the groove 112. In other words, the filter medium can be surrounded by a frame which is placed within the frame defined by the flexible material components 41, 42 and 43, for example. The filter cloth or medium is loosely arranged within the frame of the compartment so that it can move either up or down toward supports 48 or 49 in accordance with the direction of filtration.

FIGURES 2 and 3 also disclose an arrangement for fastening the opposite ends of the filter band means together. Thus, a hinge joint is provided between transverse compartment edge-defining means 43 and 44 which includes the tongues 115 and 116 separated by equally dimensioned recesses and staggered so as to interlock as shown. An opening is provided through the center line of all of the tongues to receive a transversely extending connecting bar 45 which functions as a hinge pin. When the compartment edge-defining components are surfaced by a more flexible material, such as 46 and 47 this material is also applied over the top and bottom surfaces of the tongues 115, 116 and is continuous for all of the frames other than the two end ones that have to be joined by the hinge means. It is also to be pointed out that the components 42 are continuous. If desired, however, a filter band means could be constructed in which a hinge joint is arranged between successive compartments.

As a further feature of the invention plates 5 and 6 are adjustable with respect to their spacing relative to plates 7 and 8. This ensures utilization of the arrangement without the components 30, 31, 32 and 40 described hereinafter or with such components. Thus, as shown in FIGURE 7 which illustrates only the upper portion of the apparatus, the endless band means 17 receives suspension through spout 9 in the successive compartments. As the compartments pass through and beneath pressure applying box 1, air under pressure is introduced thereinto via inlet 33 to place the suspension in successive compartments under pressure and force the liquid component thereof through each filter cloth 100 and through the perforations, not shown, in plate 7 and into receptacle 3. The cake can be removed during travel of the endless band filtering means down to spout 10 as in FIGURE 1 wherein further suspension is introduced into the compartments which successively pass through the pressurizing compartment 2 wherein the pressure flowing through the successive filter means 100 is exerted in the opposite direction which has a tendency to clean such filter means and prevent clogging, it being assumed that plates 5 and 7 and 6 and 8 are so spaced as to apply a compression on the components 41, 42, 43 and 44.

FIGURE 1 illustrates a further form of applying pressure and includes a band 32 of the same transverse dimensions as band 17, including longitudinal and lateral flexible components 34 which divide the band 32 into successive compartments of the same size as the compartments in band means 17. Secured to the sides and ends of each of these compartments is a water proof membrane or cloth 40 that is loosely arranged therein. This band 32 rotates between rollers 30 and 31, and is provided with a tooth arrangement 34' which fits in a correspondingly shaped groove 41', FIGURES 2 and 6 or meshes with a pair of correspondingly shaped teeth, not shown, provided on the upper surfaces of the side and end components of the endless band means 17, so that the movement of the band means 17 drives band 32 in synchronism therewith. Assuming the band means 32 and 17 are moving between plates 5 and 7, a liquid is introduced under pressure through opening 33 into pressurizing compartment 1. This pressurizing liquid places the compartments in band means 32 under pressure and forces the waterproof cloth or fabric or rubber sheeting 40 down into the underlying compartment of the band means 17 to place pressure on the suspension in that compartment to force the liquid component thereof through the filter medium such as 100. In order to ensure continual feed of the pressurizing liquid, a narrow space is provided between the upper edges of the band means 32 and plate 5 so that the pressurizing fluid can escape laterally. The escaping pressurizing fluid is collected in compartments, not shown, that are separated from filtrate compartment 3 so that the escaping pressurizing liquid will not become admixed with the filtrate. The pressurized liquid is recovered and recirculated through pressurizing compartment 1.

The invention is of course not to be limited to the precise form of endless band means disclosed since it is possible to provide an endless filtering cloth having lateral edges that are enlarged and formed by rubber or rubberized material so that the filtering cloth is disposed intermediate the upper and lower surfaces of these edges, assuming they are horizontal, and in which transverse enlarged portions are provided to define successive filtering compartments.

The invention further provides for cleaning of the filter cloths by either two successive filtrations in respective opposite directions, as shown in FIGURE 1 or by introducing a cleansing liquid following a first filtration in the same direction as such first filtration, assuming that this liquid is capable of dissolving out soluble particles contained in the cake.

It is of course understood that the movement of the successive filtering zones defined by the respective components 41, 42, 43 and 44, respectively, can be intermittent rather than continuous.

What is claimed is:

1. A process of filtering liquids out of suspensions of solids in liquids comprising continuously feeding suspension into a plurality of continuously moving and successive filtering zones each having a filtering medium therein, confining the suspension in the successive zones to prevent escape of liquid except through the filtering medium therein, moving the zones through a pressure applying region and in such region applying pressure on to the suspension in each zone in a direction transverse to the direction of movement of the zones to force liquid through the filtering medium in each zone to effect a first filtration, continuing the movement of the zones, removing the residue of solids from each zone, continuously inverting the successive zones, continuously refilling the same with suspension and repeating the confining and pressure applying steps to effect a second filtration through the filtering medium in each zone in a flow direction opposite to that of the first filtration.

2. Apparatus for filtering liquids out of suspensions of solids in liquids comprising means for defining a plurality of successively arranged compartments defining successive filtering zones, a filter medium extending across each compartment, means for moving such zones, means for feeding suspension on top of the medium in the successive zones, means along the path of movement of the zones to prevent the escape of liquids from such zones except through the mediums therein, a pressure applying means also along the path of movement of such zones for applying pressure to the suspension in successive zones in a direction transverse to the direction of such zones to force liquid through the filtering medium, means for collecting such filtered liquid, the means defining the plurality of successively arranged filtering zones comprising endless band means having successive compartments therein, said filtering mediums comprising an individual filtering medium extending across each compartment, a plurality of pairs of rollers over which said band means is trained, said rollers being on different levels, said pressure applying means being between the upper pair of rollers and on the upper side of the band means, a second pressure applying means between the lower pair of rollers and on the upper side of the portion of the band means that moves therebetween and means for feeding additional suspension on such band means at a position in advance of said second pressure applying means to effect a second filtration through such zones in a direction opposite to the first.

3. Apparatus for filtering liquids out of suspensions of solids in liquids comprising endless band means having successive compartments therein to define a plurality of successively arranged filtering zones, a filtering medium extending across each compartment, a plurality of pairs of rollers over which said band means is trained, said rollers being at different levels, a pressure applying means located between an upper pair of rollers and on the upper side of the band means as it moves between said upper rollers, a second pressure applying means between a lower pair of rollers and on the upper side of the portion of the band means that move therebetween, means for moving said band means, means for feeding suspension to the band means at a location in advance of the first pressure applying means, means along the path of movement of the band means for preventing escape of liquid from the zones except through the filtering medium, collecting means arranged between the upper pair of rollers and beneath the band means for collecting filtered liquid, means for feeding additional suspension on the band means at a position in advance of said second pressure applying means so that a second filtration can be effected through each compartment in a direction opposite to that of the first filtration, additional collecting means between and beneath the lower pair of rollers and beneath the portion of the band means that passes therebetween so as to collect filtered liquid from the second filtration and said pairs of rollers including an intermediate pair of rollers arranged inwards of the rollers of the upper and lower pairs of rollers.

4. Apparatus as claimed in claim 3 in which said endless band means has lateral edge members and a plurality of transversely extending members so that said members together define the successive compartments, said members being of compressible material, said pressure applying means comprising a chamber adapted to receive fluid under pressure, a second band means supported for movement in synchronism with and in contact with said first band means, said second band means including longitudinal and transverse compartment defining components corresponding to and registrable with the members of the first band means, a flexible water proof membrane extending across the compartments of the second band means and means for introducing pressure medium into said chamber so that when the superposed band means pass through said chamber the pressure medium introduced thereinto compresses the successive water proof membranes against the suspension in the registered and underlying compartments in the first band means.

5. Apparatus as claimed in claim 4 and said second pressure applying means also comprising a pressure receiving chamber and means for introducing a pressure medium thereinto.

6. Apparatus as claimed in claim 3 in which said endless band means is made of compressible material, the means along the path of movement of the band means for preventing escape of liquid from the zones except through the filtering medium therein comprising a plate means disposed between the upper pair of rollers and over which said band means moves, a second plate means above and parallel to the first plate means, said second plate means having grooved end portions so that as the band moves thereunder it is compressed between said plate means, said first plate means having perforations therein and a chamber associated with said second plate means and adapted to receive oil under pressure for applying pressure to the suspension in the successive zones as they pass through the chamber.

References Cited in the file of this patent

UNITED STATES PATENTS

| | | |
|---|---|---|
| 1,789,425 | Cabrera | Jan. 20, 1931 |
| 2,111,720 | Padgett | Mar. 22, 1938 |
| 2,753,766 | Simpson | July 10, 1956 |
| 2,793,756 | Haltmeier | May 28, 1957 |
| 2,895,614 | Komline | July 21, 1959 |
| 2,910,185 | Wehner | Oct. 27, 1959 |